(12) United States Patent
El Rifai et al.

(10) Patent No.: US 7,041,963 B2
(45) Date of Patent: May 9, 2006

(54) HEIGHT CALIBRATION OF SCANNING PROBE MICROSCOPE ACTUATORS

(75) Inventors: Osamah M. El Rifai, Cambridge, MA (US); Kamal Youcef-Toumi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 202 days.

(21) Appl. No.: 10/722,806

(22) Filed: Nov. 26, 2003

(65) Prior Publication Data

US 2005/0109925 A1 May 26, 2005

(51) Int. Cl.
*H01J 3/14* (2006.01)
*H01J 40/14* (2006.01)
*H01J 5/16* (2006.01)
*G01J 5/02* (2006.01)

(52) U.S. Cl. .................. 250/234; 73/1.79; 73/105; 250/341.5

(58) Field of Classification Search ............. 250/341.5
See application file for complete search history.

(56) References Cited

U.S. PATENT DOCUMENTS

| | | | |
|---|---|---|---|
| 5,051,646 A | 9/1991 | Elings et al. | |
| 5,066,858 A | 11/1991 | Elings et al. | |
| 5,077,473 A | 12/1991 | Elings et al. | |
| 5,081,390 A | 1/1992 | Elings | |
| 5,155,359 A | 10/1992 | Monahan | |
| 5,198,715 A | 3/1993 | Elings et al. | |
| 5,200,617 A | 4/1993 | Hayes et al. | |
| 5,306,919 A | 4/1994 | Elings et al. | |
| 5,384,507 A | 1/1995 | Takada et al. | |
| 5,418,363 A | 5/1995 | Elings et al. | |
| 5,463,897 A | 11/1995 | Prater et al. | |
| 5,469,734 A | 11/1995 | Schuman | |
| 5,497,656 A | 3/1996 | Kado et al. | |
| 5,557,156 A | 9/1996 | Elings | |
| 5,568,003 A | 10/1996 | Deck | |
| 5,641,897 A | 6/1997 | Schuman | |
| 5,644,512 A | 7/1997 | Chernoff et al. | |
| 5,665,905 A | 9/1997 | Bartha et al. | |
| 5,773,824 A * | 6/1998 | Flecha et al. .............. 250/306 |
| 5,801,381 A | 9/1998 | Flecha et al. | |
| 5,804,708 A | 9/1998 | Yamanaka et al. | |
| 5,825,670 A * | 10/1998 | Chernoff et al. ............. 702/85 |
| 5,877,497 A | 3/1999 | Binnig et al. | |
| 5,898,106 A | 4/1999 | Babcock et al. | |
| 5,920,067 A | 7/1999 | Cresswell et al. | |
| 6,016,684 A | 1/2000 | Scheer et al. | |
| 6,049,115 A * | 4/2000 | Takahashi et al. ......... 257/417 |
| 6,237,399 B1 * | 5/2001 | Shivaram et al. ............ 73/105 |

(Continued)

OTHER PUBLICATIONS

International Search Report for Application No. PCT/US2004/034390 dated Apr. 12, 2005.

(Continued)

*Primary Examiner*—Stephone B. Allen
*Assistant Examiner*—Suezu Ellis
(74) *Attorney, Agent, or Firm*—Daly, Crowley, Mofford & Durkee, LLP (57) ABSTRACT

A mechanism for calibrating a scanning probe microscope is presented. The calibration mechanism operates to apply an input signal to an actuator to cause acceleration of the actuator and to measure a value indicative of deflection of a cantilever attached to the actuator, as a result of the actuator acceleration. The measured deflection value is used to determine a corresponding value of actuator displacement.

36 Claims, 6 Drawing Sheets

U.S. PATENT DOCUMENTS

| | | |
|---|---|---|
| 6,244,103 B1 | 6/2001 | Berghaus et al. |
| RE37,299 E | 7/2001 | Amer et al. |
| RE37,404 E | 10/2001 | Harp et al. |
| 6,340,858 B1 | 1/2002 | Jaenker |
| RE37,560 E | 2/2002 | Elings |
| 6,357,285 B1 | 3/2002 | Allen |
| 6,410,907 B1 | 6/2002 | Cleveland et al. |
| 6,661,004 B1 | 12/2003 | Aumond et al. |

OTHER PUBLICATIONS

Schaffer, T.E., ET AL., "Characterization and Optimization of the Detection Sensitivity of an Atomic Force Microscope for Small Cantilevers", Journal of Applied Physics AIP USA, vol. 84, No. 9, Nov. 1, 1998, pp. 4661-4666.

Kindt, Johannes H. ET AL., Atomic Force Microscope Detector Drift Compensation by Correlation of Similar Traces Acquired at Different Setpoints, Review of Scientific Instruments, American Institute of Physics, UA, vol. 73, No. 6, Jun. 2002, pp. 2305-2307.

Aumond, B.D. ET AL., "High Precision Metrology by Means of a Novel Stero Imaging Technique Based on atomic Force Microscopy", Proceeding of the SPIE—The International Society for Optical Engineering SPIE—Int. Soc. Opt. Eng USA, vol., 4344, Feb. 26, 2001, pp. 46-57.

Pingali, G.S. ET AL., "Restoration of Scanning Probe Microscope Images", Applications of Computer Vision, Proceeding, 1992, IEEE Workshop on Palm Springs, CA, USA, Nov. 30-Dec. 2, 1992, Los Alamitos, CA, USA, IEEE Comput. Soc, US, Nov. 30, 1992, pp. 282-289.

* cited by examiner

HEIGHT CALIBRATION OF SCANNING PROBE MICROSCOPE ACTUATORS

CROSS-REFERENCE TO RELATED APPLICATIONS

Not applicable.

STATEMENT REGARDING FEDERALLY SPONSORED RESEARCH

Not applicable.

FIELD OF THE INVENTION

This invention relates generally to calibration of scanning probe microscope (SPM) actuators.

BACKGROUND OF THE INVENTION

The field of nanotechnology has rapidly evolved over the years as a result of significant interest in sub-micron research studies and applications. Accordingly, new challenges and technical problems have been encountered both at the research and application levels. These challenges span a wide range of fields of science and engineering. One such challenge is the ability to characterize surfaces and material properties at the sub-micron level. Several tools are available for this task. Such tools include the scanning electron microscope (SEM), the transmission electron microscope (TEM) and the scanning probe microscope (SPM), including the scanning tunneling microscope (STM) and the atomic force microscope (AFM). Each of these tools has its strengths and weaknesses. The AFM offers very high resolution (10 nm lateral and 0.05 nm vertical resolution are typical), compatibility with different types of samples and operating media, and generally requires no sample preparation. For these reasons, the AFM has become a widely used instrument in many disciplines. For example, in the field of semiconductors, AFM is used for surface roughness measurements of fabricated devices, integrated circuit failure analysis and nanolithography patterning resolution investigations.

Typically, a SPM such as an AFM includes a probe mounted on a cantilever, a sensor to measure the deflection of the cantilever and an actuator (sometimes referred to as a "scanner") to provide three-dimensional relative motion between the probe and a sample. In contact mode, the probe is brought into contact with the sample at a user-specified force or cantilever deflection. The actuator is then moved in a raster fashion. During scanning, changes in the sample topography produce changes in the cantilever deflection. A controller maintains the deflection constant by adjusting the vertical displacement of the actuator (and, therefore, the cantilever-mounted probe) relative to the sample. The sample image is generated in response to the correcting voltage sent to the actuator.

The wide use of SPM and, in particular, AFM, in various fields has imposed ever-increasing stringent requirements on its performance. Among the factors limiting the tool's performance and repeatability is the accuracy of the actuator displacement. The accuracy of measurement data ultimately depends on the calibration of the actuator. Many actuators used in SPM, such as piezoelectric actuators, exhibit nonlinear input to displacement response. For example, piezoelectric actuators used in AFM have typical displacement ranges of 10 to 100 um laterally, and 4 to 10 um vertically.

According to conventional calibration approaches, calibration of the actuator is performed by imaging a standard sample or grating having a known characteristic dimension. The voltage to displacement sensitivity is then computed from the applied voltage and the known dimension(s) of the standard. A linear sensitivity is assumed for vertical calibration.

Due to nonlinear actuator displacement, however, calibration may be affected by the bias voltage applied to the actuator to maintain probe-sample contact at the desired set-point during scanning. In addition, computed sensitivity may depend on scan speed due to creep (i.e., a slow response of the actuator to a rapid change in input signal). Thus, images obtained at a slow scan speed would yield larger sensitivity compared to images performed at faster speeds. Moreover, standards with a small height compared to the actuator range are commonly used for calibration to reduce the effect of hysteresis associated with the piezoelectric actuator. Consequently, calibration would only be accurate for a small fraction of the total actuator range (typically 3%). Imaging samples with features taller than the standard used for calibration could be corrupted by both hysteresis and nonlinearity due to the actuator's displacement.

SUMMARY OF THE INVENTION

Accordingly, the present invention features a calibration mechanism that allows calibration of a scanning probe microscope (SPM) actuator's full range of vertical displacement.

In one aspect of the invention, calibrating a SPM includes applying an input signal to an actuator of a SPM to cause acceleration of the actuator, measuring a value indicative of deflection of a flexible structure attached to the actuator, as a result of the actuator acceleration, and determining a corresponding value of actuator displacement from the deflection value.

The foregoing aspect of the invention may include one or more of the following features. The flexible structure may be a cantilever. The displacement may be a vertical displacement. The measurement of deflection values and determination of corresponding actuator displacement values may be repeated for the application of different values of the input signal to the actuator to produce corresponding vertical displacement values within a predetermined range of vertical displacement values. A map relating the different input signal values to the corresponding vertical displacement values may be generated for use by the scanning probe microscope. The cantilever may include be a piezoresistive cantilever. Also, the actuator may be a piezoelectric actuator.

In another aspect of the invention, characterizing a sample using a SPM includes providing a map to a controller of a scanning probe microscope having an actuator and using the map in connection with a sample characterization task to compensate for nonlinear vertical displacement of the actuator. The map includes a mapping of input signals to the actuator to corresponding vertical displacement values obtained by applying the input signals to the actuator and measuring a deflection of a flexible structure attached at one end to the actuator.

Particular implementations of the invention may provide one or more of the following advantages. While the heights of commercially available calibration standards are but a fraction of the actuator's total vertical displacement range, the present invention provides for calibration of up to the full range of an actuator's vertical displacement and at a much lower cost than the standards. Unlike prior techniques, the calibration mechanism of the present invention is not affected by actuator creep or drift, so it provides a substantial improvement in accuracy by reducing errors due to actuator nonlinearity hysteresis and creep.

Other features and advantages of the invention will be apparent from the following detailed description, and from the claims.

BRIEF DESCRIPTION OF THE DRAWINGS

The invention will be more fully understood from the following detailed description taken in conjunction with the accompanying drawings, in which.

DETAILED DESCRIPTION

Figure 1:
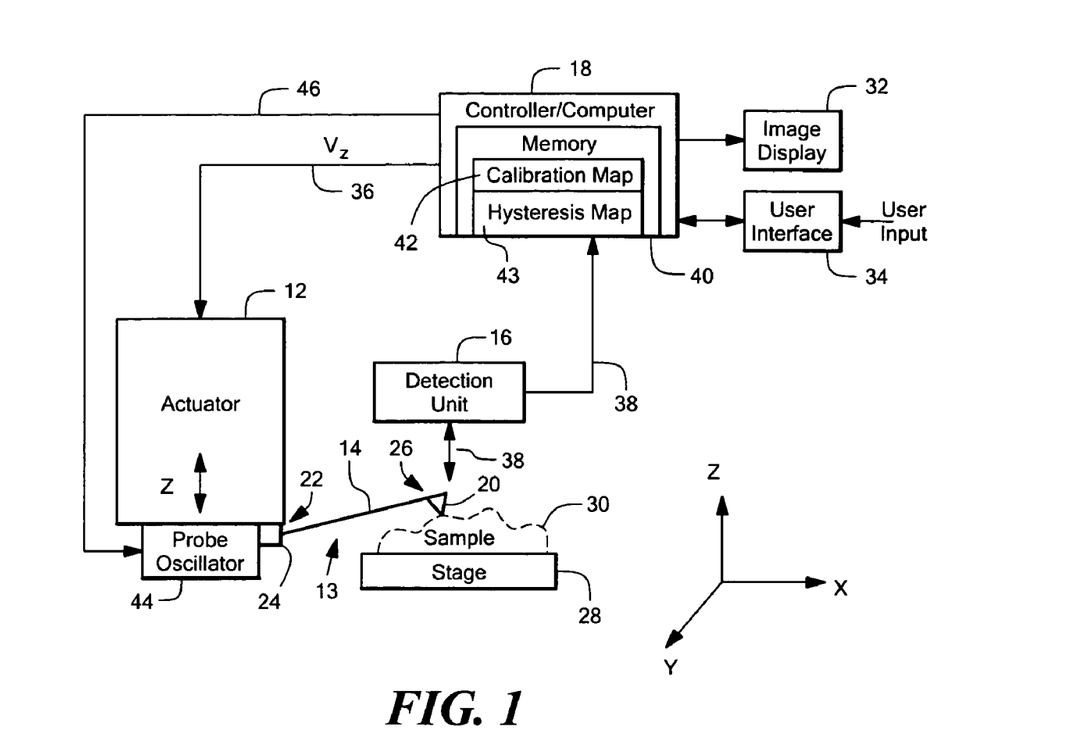
FIG. 1 is a schematic block diagram of an exemplary atomic force microscope (AFM) that uses a calibration map to map actuator input signal to actuator displacement for a range of vertical displacement values.

Referring to FIG. 1, an exemplary scanning probe microscope (SPM) 10 that performs sample characterization tasks such as sample imaging is shown. The SPM 10 is depicted as an atomic force microscope (AFM). Components of the AFM 10 include an actuator 12, a probe assembly 13, which includes a flexible structure shown as a cantilever 14, a detection unit 16 and an AFM controller/computer 18. A probe or probe tip 20 is mounted on the cantilever 14 of the probe assembly 13. The cantilever 14 includes a fixed end 22, typically supported in a cantilever holder 24, and a free distal end 26, opposite the fixed end 24, that receives the probe 20. A stage 28 is provided to support a sample (indicated in dashed lines by reference numeral 30) to be characterized. In the illustrated embodiment, the AFM 10 also includes an image display 32 and a separate user interface (for example, a control console) 34, each coupled to the controller/computer 18. The user interface 34 operates to receive user input and provide the user input to the computer 18, as well as to receive data (e.g., scan data) from the computer 18 for viewing and analysis by the user.

In one embodiment, to be described herein, the actuator 12 is implemented as a piezoelectric actuator. There are many ways to construct a piezoelectric actuator. For example, the actuator may be implemented as either a single or two-piece construction. In the two-piece construction, one piece could be dedicated to lateral (XY) motion while the other piece could be dedicated to vertical (Z) motion. Alternatively, the actuator may provide only Z positioning while the lateral movement is provided elsewhere, for example, by the stage 28. Most one-piece construction piezoelectric actuators are tube-shaped, typically having fours electrode on the outer surface and one electrode on the inner surface. Application of an input signal, typically an input voltage signal, to one or more of the electrodes causes the tube to bend for lateral displacement, or to stretch or contract for vertical displacement.

In operation, the interaction between the probe 20 and the sample surface causes changes in the behavior of the cantilever 14. The controller/computer 18 receives as input from the user a set of input parameters, for example, in the case of sample imaging, scan parameters such as scan size, scan rate and resolution. Other parameters may be provided as well. The probe 20 is brought into proximity with the sample 30 by means of the actuator and/or by other means for example a motion stage. As a result, the behavior or response of the cantilever 14 changes, as an example, it may deflect. That change in the behavior of the cantilever 14 is measured by a suitable detection unit such as detection unit 16, which provides a detector output signal 38 indicative of the measured behavioral change (typically a voltage signal) which could be sent to the controller/computer 18.

The AFM 10 may be used to perform various types of sample characterization tasks. As mentioned earlier, one such task is sample imaging. During sample imaging, the AFM 10 operates by placing the probe 20 on the sample surface and then scanning the surface laterally. For a constant force contact mode of scanning operation, the controller 18 maintains a constant cantilever force by adjusting the vertical displacement of the actuator 12 (by adjusting $V_z$) in response to the detector output signal 38 and the user-selected set-point. Changes in the vertical displacement of the actuator 12, indicative of changes in the sample topography, are accumulated and processed by the controller/computer for viewing by the user. Other tasks can include, for example, measurement of sample material properties, which may involve the repeated movement of the probe in only the Z direction (that is, repeated up and down movement) to measure force between the probe and sample. In this case, the vertical displacement would be used to provide some information about a material property of interest, such as a mechanical or physical property. Other uses of the AFM 10 are contemplated as well.

The controller/computer 18 stores in a memory 40 a map 42 shown as a calibration map. Calibration data of the calibration map provides values of input signal (e.g., input voltage signal $V_z$) for a desired range of vertical actuator displacement values, or vice versa provide values of vertical actuator displacement for a desired range of input signal, and thus provides an indication of nonlinear input to displacement sensitivity The controller/computer 18 can use the calibration map 42 in various ways, depending on the task being performed. For example, in an imaging application, the controller/computer 18 uses the map to determine a more accurate vertical displacement value for a given applied input signal $V_z$. As mentioned earlier, the vertical displacement values are stored, and possibly made available for further processing and display to the user. The calibration map 42, which may be in the form of a model, an equation or set of equations, a lookup table, a file or some other data structure, is generated by a calibration apparatus, as will be described with reference to FIGS. 3 and 4 below. The actuator 12 may require calibration on a periodic basis, for example, monthly. Each time the actuator 12 is re-calibrated, the data in the calibration map 42 is updated.

Alternatively, or in addition to the calibration map 42, the memory can store hysteresis characterization data ("hysteresis map") 43. The hysteresis map 43, which maps input signal to corresponding values of vertical displacement, may be generated by the same apparatus as that which is used to generate the calibration map 42, as will be described with reference to FIGS. 3 and 6–8 below. It will be appreciated that the controller/computer 18 may be configured with only one of the maps 42, 43, or may be configured with both of the maps 42, 43 (as shown in FIG. 1).

The detection unit 16 is typically an optical detection system. An optical detection system typically includes a laser and a photodetector that interact according to one of various known techniques, e.g., optical beam bouncing. The detection unit 16 could also be a piezoresistor integrated in the cantilever 14 with an associated measuring circuit, for example, to measure the change in resistance of the piezoresistor. As the piezoresistive cantilever's noise performance in air has been found to be far inferior to that of its optical counterpart, and suffers from drift and poor long-term stability, its use tends to be limited to AFM operation in ultra-high vacuum. Alternatively, if the cantilever is a piezoelectric cantilever, the detection unit 16 could include a device that measures for example the impedance of a piezoelectric element of a piezoelectric cantilever, or some other detection apparatus. For example, the cantilever could be implemented with capacitive elements and the detection unit 16 configured to measure a change in the capacitance of the capacitive elements.

To support other imaging operation modes besides contact mode, such as the so called tapping mode, the AFM 10 may include a probe oscillator 44, coupled to the cantilever 14. The probe assembly 13 can be oscillated by the probe oscillator 44 appropriately usually at or near a resonance frequency. A signal 46 is applied, under the control of the AFM controller/computer 18, from an AC source (not shown) to the oscillator 44 to drive the probe assembly to oscillate.

The AFM shown in FIG. 1 is configured by attaching the cantilever to the actuator. Alternatively, the AFM could employ a different design, for example, the sample could be placed on the actuator while the cantilever is fixed in space.

Figure 2:
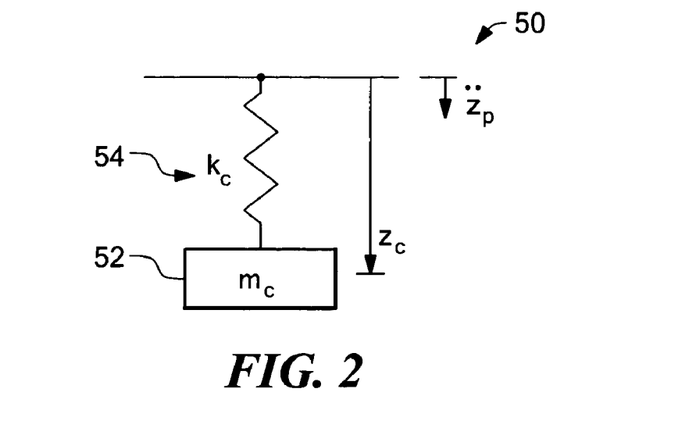
FIG. 2 is a simple schematic model of an accelerometer.

The apparatus and techniques used to produce the calibration and hysteresis characterization data are based on an accelerometer model. FIG. 2 shows a simple representation of an accelerometer 50. The accelerometer 50 can be characterized by a flexible structure having a movable mass $m_c$ 52 and a stiffness $k_c$ 54. When the structure is subjected to an acceleration signal $\ddot{z}_p$, for example, a sinusoidal acceleration signal, its displacement response $z_c$ measured relative to $z_p$, is related to the acceleration signal. In the simple representation of FIG. 2 and under an acceleration $\ddot{z}_p$, the measured response $z_c$ of the mass $m_c$ is governed by $$\ddot{z}_c + \omega_c^2 z_c = -\ddot{z}_p, \text{ where } \omega_c = \sqrt{\frac{k_c}{m_c}}.$$  Eq. 1

The response of $z_c$ as a function of time to any displacement $z_p$ or acceleration signal $\ddot{z}_p$ can be found analytically or numerically by appropriate methods for solving linear ordinary differential equations with constant coefficients (i.e., linear time-invariant finite-dimensional dynamic systems). A requirement on $z_p$ is that $\ddot{z}_p \neq 0$ for all times. For the case when $z_p = A \sin(\omega t)$, and $\omega < \omega_c$, the steady state response (after appropriately long time) of $z_c$ is given by $$|z_c| = A\left(\frac{\omega}{\omega_c}\right)^2.$$  Eq. 2 where A is the displacement amplitude, $\omega$ is the frequency of the the acceleration source and $\omega_c$ is the natural frequency of the flexible structure. According to Eq. 2, the displacement amplitude A of $z_p$ where $|z_p|=A$ can be determined from the measured response $z_c$.

Figure 3:
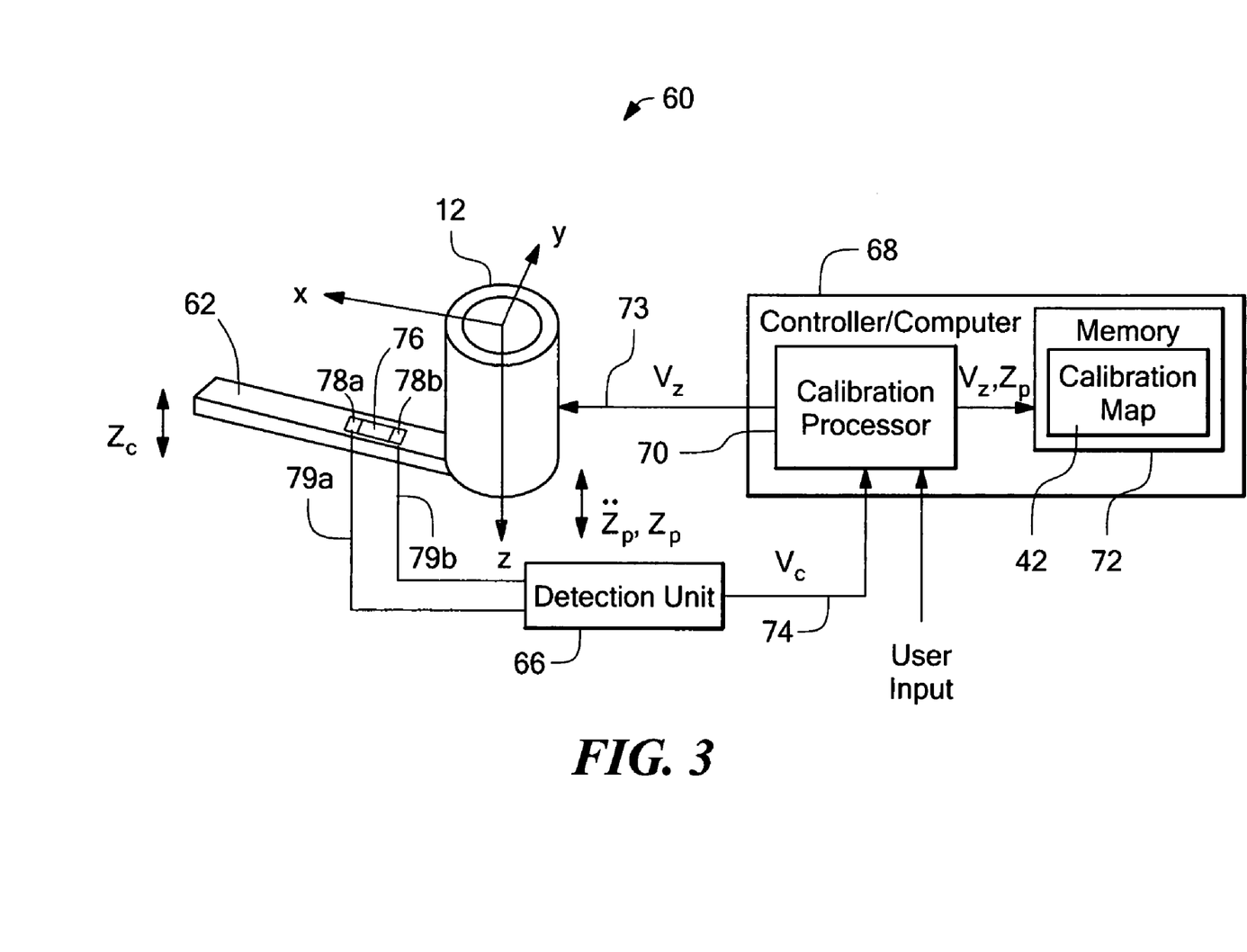
FIG. 3 is a calibration apparatus (based on the accelerometer model of FIG. 2) usable to perform a calibration procedure in order to produce the calibration map shown in FIG. 1.

Referring to FIG. 3, an exemplary AFM calibration setup or unit 60 based on the accelerometer model of FIG. 2 is shown. The AFM calibration unit 60 thus includes a device having a structure that has inertia (mass) and flexibility/compliance (that is, is capable of deflection motion when subject to an acceleration), and some mechanism by which the motion of the structure can be detected directly or indirectly, at a single point or multiple points. In the illustrated embodiment, this device is in the form of a calibration cantilever 62, which is held by the cantilever holder (not shown) of the AFM/actuator to be calibrated, shown here as the piezoelectric actuator 12 (from FIG. 1). Although a cantilever is shown, it will be understood that any device satisfying the accelerometer model requirements of mass, flexibility/compliance and deflection detection capability could be used. For example, the device could include a flexible structure (of mass) to which additional inertia (mass) has been coupled.

The unit 60 further includes a calibration detection unit 66 and controller/computer 68 configured with a calibration processor 70. The controller/computer 68 includes or is coupled to a memory 72, which is used to store the calibration map 42 (from FIG. 1) and/or hysteresis map 43 (also from FIG. 1, not shown here) generated by the calibration processor 70 during calibration. The term "calibration" as used herein refers to both the process of generating calibration data (reflecting input to displacement sensitivity) and the process of generating hysteresis characterization data. It will be appreciated that the controller/computer 68 can be the same controller the AFM uses for sample characterization task(s), i.e., controller/computer 18 from FIG. 1. In one embodiment, the functionality of the calibration processor 70 is implemented in software. In other embodiments, such functionality may be implemented in software, hardware or a combination of software and hardware. A dedicated calibration controller, implemented in software, hardware or a combination of software and hardware, could also be used.

In the accelerometer-based AFM calibration unit 60, the source of acceleration is the actuator displacement $z_p$ and the cantilever 62 is the flexible structure. An input signal "$V_z$" 73, shown and described herein in one embodiment as a sinusoidal voltage signal $V_z$ from an AC signal source (not shown), is applied to the actuator 12 under the control of the calibration processor 70 of the controller/computer 68 to cause a vertical displacement of the actuator 12. The resulting deflection of the cantilever 62, that is, response $z_c$, is measured by the detection unit 66 here as a voltage, which is provided to the controller/computer 68 as displacement output signal $V_c$ 74. Although the input signal 73 that is discussed herein within the context of a piezoelectric actuator calibration is a sinusoidal voltage signal $V_z$, it will be appreciated that the unit can be configured to use any type of input signal that is suitable to the type of actuator to be accelerated. That is, for any input signal and actuator, it is possible to formulate an appropriate expected output signal, and determine the relationship between the input signal and output signal.

The response $z_c$ of the cantilever 62 to the actuator displacement is related to the displacement $z_p$ of the actuator according to Eqs. 1 and 2. Thus, the calibration processor 70 determines the actuator displacement $z_p$ from the measured output voltage $V_c$. The calibration processor 70 repeatedly makes this determination for different values of $V_z$ so that a desired range of displacement values (preferably corresponding to the entire displacement range of the actuator) are obtained. The results are recorded in the calibration map 42 in memory 72, where they are available for use any time before, during and/or after sample characterization task(s).

Preferably, and with reference to Eqs. 1 and 2 above, parameters are optimized to make $\omega_c$ as low as possible and $\omega$ as high as possible (while still satisfying the relationship $\omega < \omega_c$) for better signal-to-noise ratio (SNR). A first mechanical resonance (of the actuator 12) that is at least a factor of 2 to 3 times higher than the driving frequency $\omega$ may ensure a quasisteady response of the actuator 12. For example, for a driving frequency $\omega$ of 200 Hz and a calibration cantilever having a length $L_c$ of 600 μm, a width $w_c$ of 50 μm and thickness $t_c$ of 0.2 μm, the resulting resonance frequency $\omega_c$ is 785 Hz.

Typically, when an optical detection system is used in an AFM such as AFM 10 (FIG. 1), the optical detection system output measures the absolute angle of the cantilever in space about both the X and Y-axes $\theta_x$, and $\theta_y$, respectively. Due to imperfections in manufacturing piezoelectric tube actuators, when a signal $V_z$ is applied to it both vertical and an unideal small lateral (bending) motions may be observed. This small lateral motion is detected by the optical detection system. Therefore, the angle $\theta_y$ that is detected by the optical detection system is comprised of cantilever deflection relative to its base plus actuator bending. Consequently, $z_p$ cannot be accurately inferred from the detector output. Therefore, because the type of measurement used for force detection during sample imaging is a poor choice for calibration purposes, the calibration unit 60 of FIG. 3 instead measures the deflection of the cantilever at a point or multiple points relative to the cantilever's fixed end proximate the actuator 12.

In one embodiment, as illustrated, this type of measurement is achieved through the use of a piezoresistive cantilever. Thus, calibration cantilever 62 includes piezoresistive material or piezoresistive elements 76. When a piezoresistive cantilever is used, the detection unit 66 is configured to detect change in the resistance of the piezoresistive elements 76. In one embodiment, the detection unit 66 can be implemented as a Wheatstone bridge circuit. Formed on the cantilever along with piezoresistive elements 76 are electrical contacts 78a, 78b. Electrical leads 79a, 79b connect respective contacts 78a, 78b to the Wheatstone bridge circuit of the detection unit 66.

During calibration, as described earlier, an acceleration of the actuator 12 causes the cantilever to deflect. The deflection causes a stress to form in the piezoresistive material of elements 76. The piezoresistive material can be, for example, silicon or some other suitable material. A change in its stress causes a change in its resistance. This change in resistance is converted to a change in voltage, via electrical leads 79, in the Wheatstone bridge. Data points collected to be used for calibration, can be easily chosen to minimize effects of drift and long term stability. For example, in the case of a sinusoidal input signal, only few oscillation cycles at few Hz to 100's Hz might typically be need.

It will be appreciated that the calibration cantilever may not be the same as the cantilever used for sample characterization tasks (e.g., image scanning). Commercially available piezoresistive cantilevers that are optimized for certain image scanning applications may not be optimal for calibration purposes.

It is clear, however, given the availability of piezoresistive cantilevers, that such cantilevers can be fabricated to fit standard AFM cantilever holders, thus eliminating the need for specialized fixtures and allowing them to be used for calibration of almost all commercial AFMs with a cantilever-on-actuator design. In addition, biasing the piezoresistors can be accomplished easily. The cantilever holders are attached to the probe oscillator that is used to oscillate the cantilever for non-contact and tapping (or intermittent) modes, as shown in FIG. 1. The wiring used for driving the oscillator may be used to bias the piezoresistive elements of the piezoresistive cantilever.

Design equations for piezoresistive cantilevers are known. For example, design equations are provided by M. Toronese in "Force Sensors for Scanning Probe Microscopy," Ph.D. Thesis, Stanford University, 1993. One fabrication technique, described by J. A. Harley in "Advances in Piezoresistive Probes for Atomic Force Microscopy," Ph.D. Thesis, Stanford University, 2000, permits fabrication of ultra-thin piezoresistive AFM cantilevers with thicknesses of 87 to 90 nm. Noise performance predictions based on the design equations and techniques discussed in these papers are found to be in good agreement with the measured performance of the cantilevers designed according the equations.

Sources of noise in piezoresistive cantilevers are mainly Johnson noise, 1/f noise, and thermomechanical noise. Johnson noise is due to thermal energy of carriers in a resistor R. It is a white noise with a spectral density function $S_j$ given by $$S_j = 4k_B T R \qquad \text{Eq. 3}$$

where $k_B$ is Boltzmann's constant and T is temperature in Kelvin of the resistor. In bandwidth of $f_{max}$ to $f_{min}$, the mean-square noise is $$V_j^2 = [16k_B T L_{leg}/wt_d \mu q p](f_{max} - f_{min}) \qquad \text{Eq. 4}$$

where $L_{leg}$ is the length of the piezoresistive cantilever leg, w is the total cantilever width, $t_d$ is doped thickness, μ mobility, q electron charge, and p doping density. On the other hand, 1/f noise has a spectral density $S_f$ given by $$S_f = \frac{\alpha V_{2B}}{Nf} \qquad \text{Eq. 5}$$

where $V_B$ is the voltage bias across the resistor, N the number of carriers, and α a nondimensional parameter that depends on annealing for an implanted resistor. In a bandwidth of $f_{max}$ to $f_{min}$, the mean-square noise is $$V_f^2 = \frac{\alpha V_B^2}{N} \ln\left(\frac{f_{max}}{f_{min}}\right) \qquad \text{Eq. 6}$$

In Eq. 6, N is proportional to the cantilever volume for a constant doping concentration. It is assumed that $N = pL_{leg}t_d w$. Thermomechanical noise is the mechanical equivalent of Johnson noise. Its spectral density $S_{tm}$ for a single mode approximation is given by $$S_{tm} = \frac{4k_B T}{k_c w_c Q_c} \quad \text{Eq. 7}$$

where $k_c$ is the cantilever stiffness, and $Q_c$ is the quality factor. The corresponding RMS displacement noise $z_{ctm}$ is $$z_{ctm} = \sqrt{\frac{4k_B T}{k_c w_c Q}}, \quad w \ll w_c \quad \text{Eq. 8}$$

$$z_{ctm} = \sqrt{\frac{4k_B T Q}{k_c w_c}}, \quad w = w_c \quad \text{Eq. 9}$$

If the piezoresistor makes up one corner of a Wheatstone bridge, the output voltage $V_o$ can be found from $$V_o = \frac{V_B \Delta R}{4R} \quad \text{Eq. 10}$$

$$\frac{\Delta R}{R} = \frac{3\pi_L E t (L_c - L_{leg}/2)}{2L_c^3} z_c \quad \text{Eq. 11}$$

where $\pi_L$ is the piezoresistive coefficient, E is modulus of elasticity, t is total thickness, w is cantilever width, and $L_c$ is cantilever length.

In practice, thermomechanical noise is seldom the dominant noise source. This exception to this is a cantilever with high $Q_c$ that is operated at its resonant frequency. Under this condition, the total root-mean-squared (RMS), displacement noise $z_{c_{min}}$ is found as $$z_{c_{min}} = \sqrt{\frac{\frac{\alpha V_B^2}{L_{leg} t_d w p} \ln\left(\frac{f_{max}}{f_{min}}\right) + \frac{16 k_B T L_{leg}}{w t_d \mu q p}(f_{max} - f_{min})}{\frac{3 V_B \pi_L E t (L_c - L_{leg})}{16 L_c^3}}} \quad \text{Eq. 12}$$

The feasibility of using a piezoresistive cantilever for calibration can be demonstrated for a cantilever designed to have adequate signal-to-noise ratio (SNR). As discussed earlier, for a driving frequency of 200 Hz, and cantilever parameters length $L_c$, width $w_c$ and thickness $t_c$ selected as 600 µm, 50 µm and 0.2 µm, respectively, the resonance frequency $\omega_c$ is 785 Hz. For this cantilever, the sensitivity of the cantilever's free end displacement to actuator displacement is found to be $$\frac{z_c}{z_p} = 0.1$$

at 200 Hz sinusoidal input signal. Typical AFM piezoelectric scanners have a resonance frequency greater than 800 Hz (>200 Hz). For a 100 Hz to 400 Hz bandwidth, Eq. 12 gives cantilever displacement noise $z_{c_{min}}$=2.9 nm RMS. The SNR is then $$SNR = \frac{0.1 z_p (\text{nm})}{2.9}.$$

For example, if $z_p$=150 nm (3% of typical actuator range), the expected SNR is 5.2.

Consequently, the technique of the present invention can be used to calibrate the actuator's vertical displacement from a few percent of its range up to its full range. In addition, the maximum strain in the cantilever remains small, less than $2 \times 10^{-3}$ for an actuator range of $z_p$=10 µm corresponding to a maximum acceleration of 1.6 g, where g is the acceleration of gravity. Linearity better than 0.1% for piezoresistive-based accelerometers has been commercially demonstrated. Moreover, the SNR can be further improved. As seen from Eq. 2, $z_c$ and hence SNR depend quadratically on the ratio of the frequency $\omega$ of the acceleration source $z_p$, to the cantilever's resonance frequency $\omega_c$. Hence, increasing this ratio would increase the SNR. Increasing $\omega$ is limited by the first resonance frequency of the actuator to ensure a quasi-static measurement. Lowering $\omega$ can be done easily by adding a so-called proof mass at the end of the cantilever as evident from Eq. 1. In addition, by setting $\omega = \omega_c$, hence operating the cantilever at resonance, the SNR can be further improved by a factor of $Q_c$. Experimental data by Harley show that typically $Q_c \geq 5$. Consequently, operating at resonance could allow calibration of the actuator's displacement from a few nanometers up to the full range of the actuator.

Figure 4:
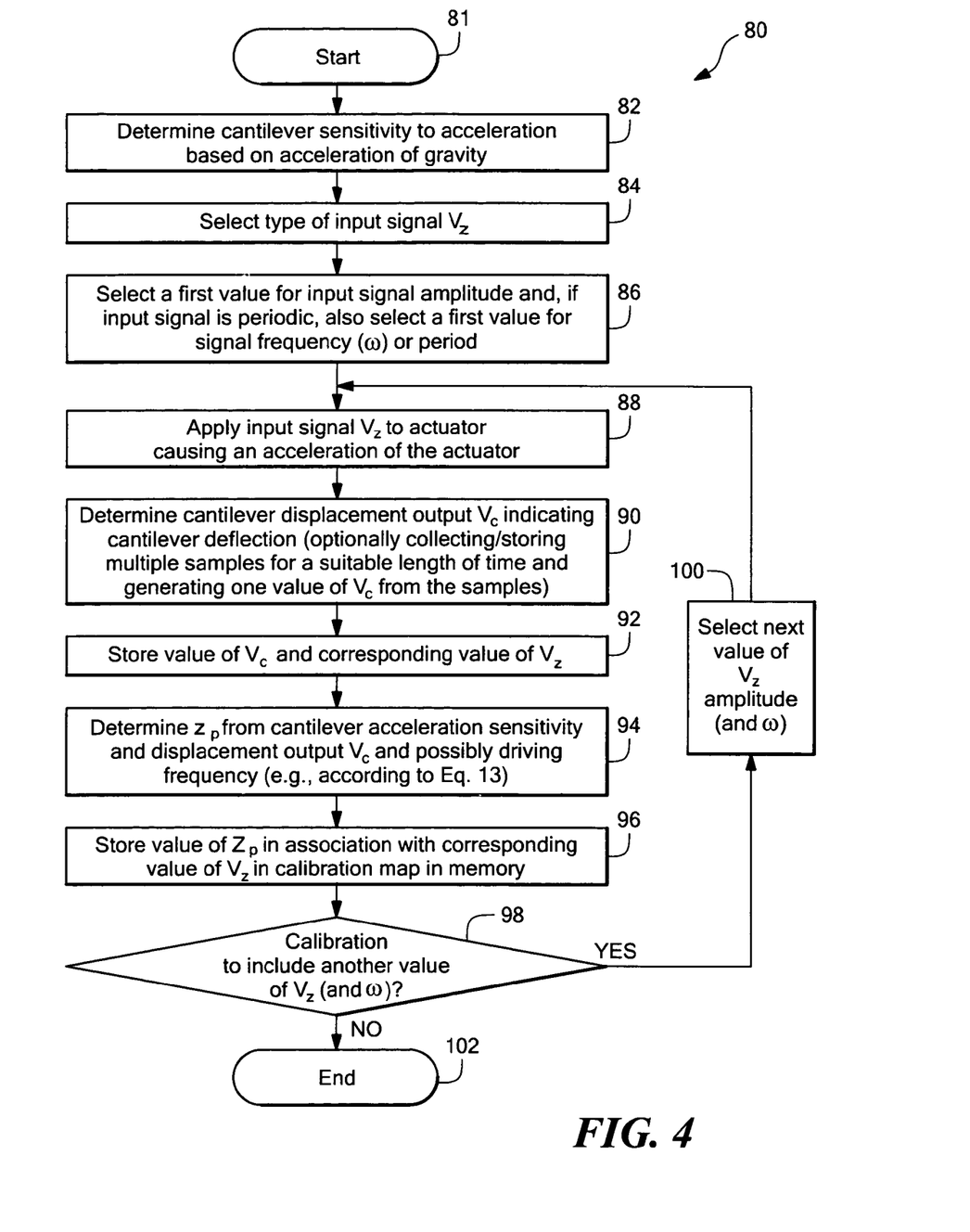
FIG. 4 is a flow diagram illustrating an exemplary embodiment of the calibration procedure.

Referring now to FIG. 4, the operation of the calibration processor 70 in generating calibration data, indicated by reference numeral 80, is as follows. The calibration processor begins (step 81) by determining the cantilever's output sensitivity to acceleration $kv_{o_a}$, where $v_{o_a}$ is the output voltage of the cantilever (that is, the output of detection system 66) when the cantilever is still (step 82). Once mounted on the actuator, the piezoresistive cantilever experiences the acceleration of gravity g. Hence, by merely measuring the cantilever's output with no actuator displacement, that is, $v_{o_a}$, its acceleration sensitivity $kv_{o_a}$ can be obtained. If designed to permit so, the cantilever can be turned over and its output again recorded, thus providing a second data point for determining the acceleration sensitivity. Once the output sensitivity to acceleration has been determined, the processor 70 selects a type of input signal "$V_z$" (if more than one type of input signal is supported) (step 84). For the selected typed of input signal, the processor 70 selects a first value for input signal amplitude and, if the selected input signal is periodic, a first value for signal frequency ($\omega$) (step 86). The processor 70 then applies the input signal $V_z$ to the actuator, causing an acceleration of the actuator (and thus the fixed end of the flexible structure, depicted in the illustrated embodiment of FIG. 3 as cantilever 62) in the Z-direction (step 88). The processor 70 determines the cantilever displacement output $V_c$ indicative of the amount of deflection of the free end of the cantilever relative to the fixed end of the cantilever via measurements taken by the detection unit, e.g., a Wheatstone bridge circuit, as discussed earlier (step 90). Multiple measurements may be taken over a suitable time period and then processed (e.g., averaged) to produce a single data point. The processor 70 stores the value of $V_c$ and corresponding value of $V_z$ (step 92). As the cantilever response is linear in $z_p$ (as shown in Eq. 2), the cantilever deflection $z_p$ as a function of the actuator input signal $V_z$ is determined from the cantilever acceleration sensitivity and output $V_c$ (and possibly the driving frequency ω, if the input signal is periodic). For example, for a sinusoidal input signal $V_z$, the cantilever deflection $z_p$ can be determined according to the relationship $$|z_p(V_z)| = \frac{V_c}{kv_{o_a}\omega^2} \qquad \text{Eq. 13}$$

(step 94). The value of $z_p$ determined for the corresponding value of $V_z$ is recorded in association with that corresponding value of $V_z$ in the calibration map (step 96).

Still referring to FIG. 4, the processor 70 determines if the calibration is to include another value of $V_z$ (as well as ω, if the input signal is periodic) (step 98). If that determination indicates that another value of $V_z$ is to be included in the calibration, the processor 70 selects the next value of $V_z$ amplitude (and ω, as appropriate) (step 100), and returns to step 88. If the determination (at step 98) indicates that no other value of $V_z$ is to be included in the calibration, the processor 70 terminates the calibration operation (step 102). The resulting calibration map contains a mapping between each input signal $V_z$ and corresponding actuator vertical displacement $z_p$.

Figure 5:
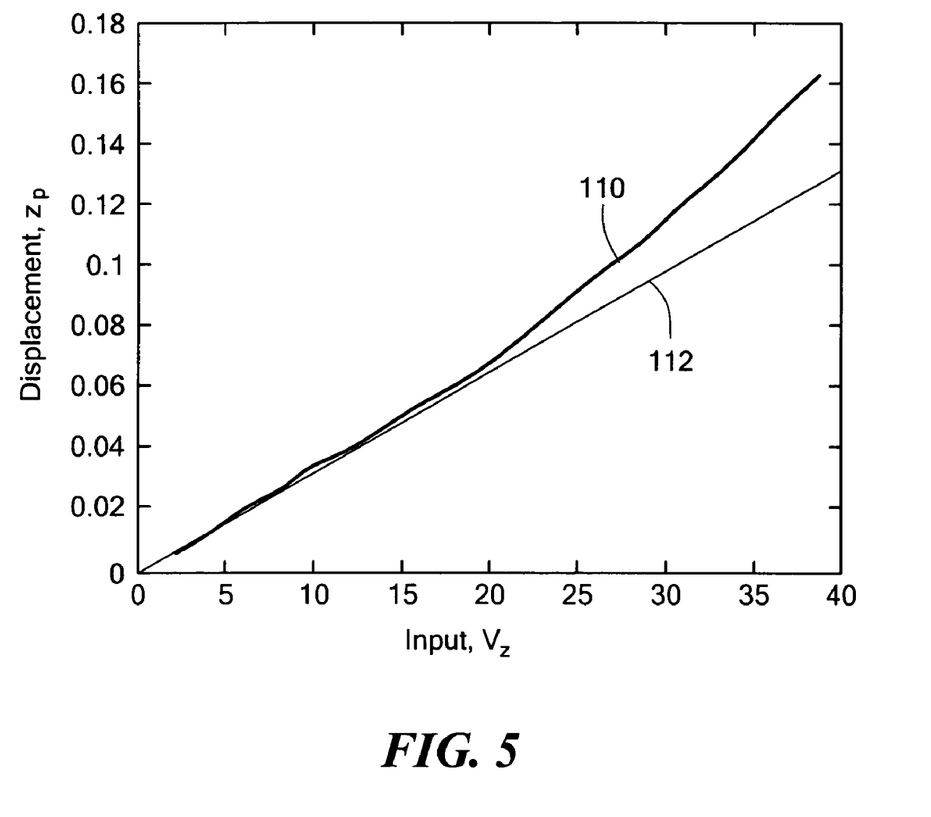
FIG. 5 is a nonlinear voltage to displacement curve of a piezoelectric actuator.

FIG. 5 shows a plot of $z_p$ as a function of $V_z$. Curve 110 captures the measured response, that is, the nonlinear voltage to displacement sensitivity, of an actuator for an applied 10 Hz sinusoidal input signal. The input amplitude was varied from 20 V up to the maximum allowable voltage of 400 V. The data are typical of a PZT actuator in that sensitivity initially increases with increased input amplitude. Although not seen from the data, when the input amplitude exceeds a certain limit, the sensitivity starts decreasing with increased input amplitude approaching a saturation limit. This limit is avoided in practice as it brings the input electric field close to the depolarization field where piezoelectric effect would be lost. A linear fit applied to the low-voltage data points of curve 110 is shown as curve 112. The linear fit gives a 24% error at full range. Accordingly, for an actuator with 5 um range there would be an error of 1.2 um at full scale using this linear fit, as is commonly done in prior calibration techniques where data are collected over only a portion of the full displacement range. The calibration technique of FIG. 4 can be used to generate data similar to that of curve 110, which would allow for accurate calibration of the actuator. Therefore, shortcomings of using an AFM for measuring tall structures such as in optical and semiconductor devices can be eliminated.

Figure 6:
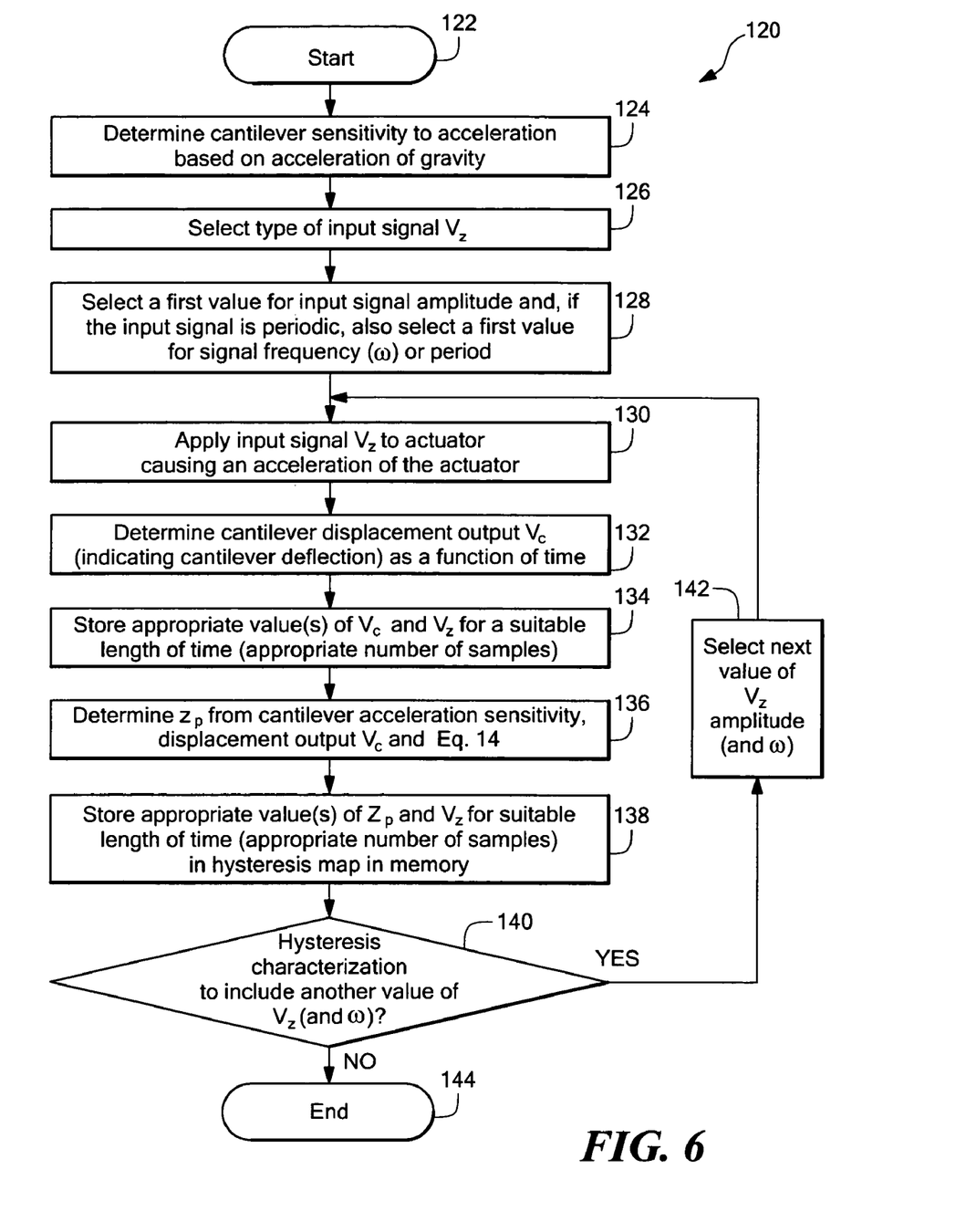
FIG. 6 is a flow diagram illustrating an exemplary embodiment of a hysteresis characterization procedure (performed by the calibration apparatus of FIG. 3)

In addition to generating calibration data, the calibration processor 70 can be used to characterize hysteresis between actuator input signal and displacement response (and possibly other nonlinear phenomena). Referring now to FIG. 6, the operation of the calibration processor 70 in generating hysteresis characterization data, indicated by reference numeral 120, is as follows. The processor 70 begins (step 122) by determining the cantilever's output sensitivity to acceleration $kv_{o_a}$ (step 124). Once the output sensitivity to acceleration has been determined, the processor 70 selects a type of input signal "$V_z$" (if more than one type of input signal is supported) (step 126). For the selected type of input signal, the processor 70 selects a first value for input signal amplitude and, if the input signal is periodic, a first value for signal frequency (ω) (step 128). The processor 70 then applies the selected input signal $V_z$ to the actuator, causing an acceleration of the actuator (and thus a deflection of the attached cantilever) in the z-direction (step 130). The cantilever displacement output $V_c$ indicative of the amount of cantilever deflection is determined for the applied $V_z$ as a function of time (that is, as a measure of acceleration $\ddot{z}_p$) (step 132). The processor 70 stores the data points that are collected for multiple instants of time over a suitable length of time (step 134). The cantilever deflection $z_p$ as a function of input signal $V_z$ is determined from the cantilever acceleration sensitivity, stored values of displacement output $V_c$ over time (that is, acceleration signal $\ddot{z}_p$) and Eq. 14 (step 136) below, which defines the relationship between $z_p$ and acceleration signal $\ddot{z}_p$ as $$\ddot{z}_p = \frac{d^2 z_p}{dt^2} \qquad \text{Eq. 14}$$

Thus, Eq. 14 can be used to compute or find $z_p$ when $\ddot{z}_p$ is known (or vice versa). Eq. 14 can be easily solved analytical and/or numerically. Value(s) of $z_p$ and $V_z$ for a suitable length of time (that is, some desired number of $z_p$ data points and corresponding $V_z$) are recorded in a hysteresis map (step 138). It will be appreciated that the number of stored values of $z_p$ need not include all of the determined values of $z_p$, that is, some may be discarded.

Still referring to FIG. 6, the processor 70 determines if the hysteresis characterization is to include another value of $V_z$ (as well as ω, if the input signal is periodic) (step 140). If that determination indicates that another value of $V_z$ is to be included in the operation, the processor 70 selects the next value of $V_z$ amplitude (and ω, as appropriate) (step 142), and returns to step 130. If the determination (at step 140) indicates that no other value of $V_z$ is to be included in the operation, the processor 70 terminates the hysteresis characterization operation (step 144). The resulting hysteresis map contains a mapping between each input signal $V_z$ and corresponding values of actuator vertical displacement $z_p$.

Figure 7:
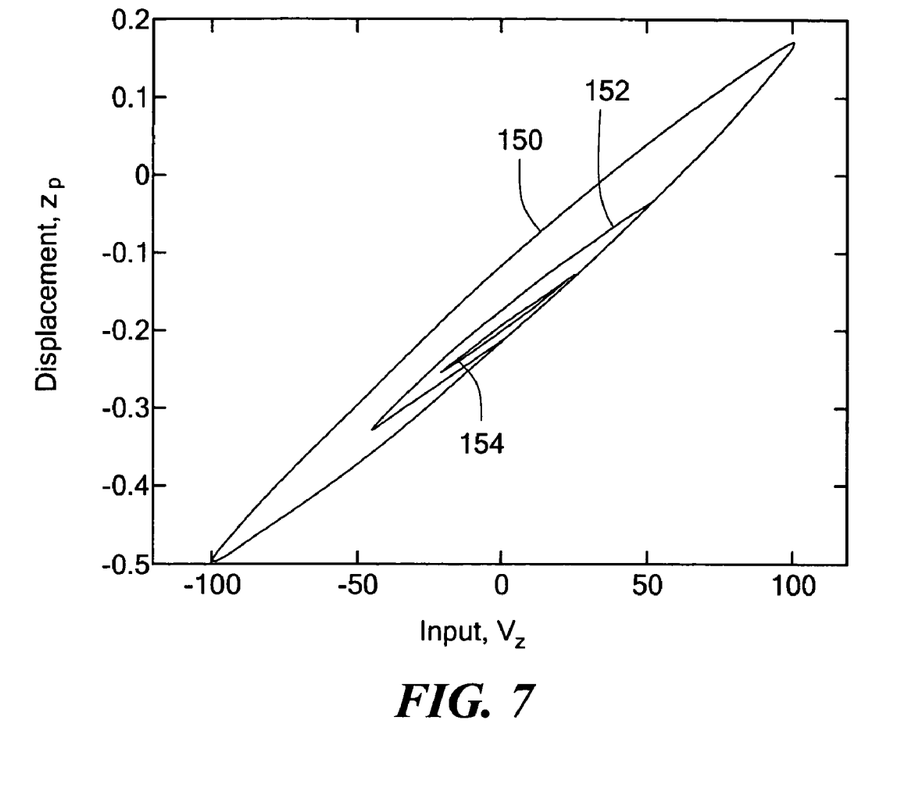
FIG. 7 is a plot of a piezoelectric actuator displacement as a function of actuator input voltage using a sinusoidal input voltage with three different amplitudes.

Thus, hysteresis between actuator input signal $V_z$ and displacement $z_p$ causes multiple possible displacement values for a single input value. FIG. 7 shows a plot of actuator displacement as a function of an actuator input signal using three different amplitudes of the sinusoidal input signal $V_z$. A hysteresis loop 150 corresponds to a first sinusoidal input range of +/−100V, a second hysteresis loop 152 corresponds to second sinusoidal input range of +/−50V and a third hysteresis loop 154 corresponds to a third sinusoidal input range of +/−25V. An observed absence of hysteresis at low electric fields and existence of hysteresis at high electric fields are demonstrated by the data shown in the figure.

Figure 8:
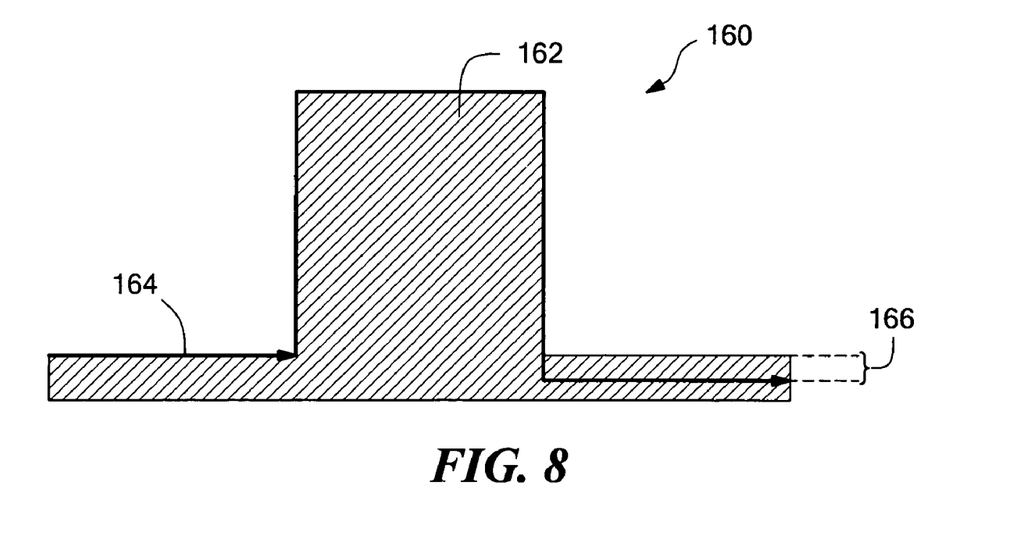
FIG. 8 is a depiction of hysteresis effect during sample imaging.

FIG. 8 provides a scan operation 160 as an example of how inaccuracy may be introduced into vertical displacement data due to hysteresis. Referring to FIG. 8, during imaging of a sample 162, if an AFM probe is to scan a step as indicated by the path of the bold arrow (reference numeral 164), the value of the voltage required to move the probe from bottom to top of the step is different from the voltage value required to move the probe from the top of the step to the bottom again. This difference is indicated as hysteresis effect 166. Accordingly, hysteresis would cause height values measured by the AFM to be different on both sides of a step. The hysteresis characterization data (produced by a process such as that illustrated in FIG. 6) can be used to compensate for such inaccuracy.

Calibration and/or hysteresis characterization data can be used in a number of applications. In one application, the data can be used prior to a task to be performed on a sample in order to obtain a desired displacement response from the actuator. For example, when an AFM is used in a scanning/imaging experiment, such data could be used before the scanning begins to generate a linear response of the actuator between input signal $V_z$ and displacement $z_p$. In another application, calibration and/or hysteresis data can be used post-task (e.g., scanning) to process/correct data of the task so that actuator displacement is corrected for hysteresis and nonlinear input-to-displacement sensitivity. In another example of post-task use, as was discussed earlier, the calibration data can be use after scanning to determine displacement values for given input signal adjustments. In addition to pre- and post-task use, the calibration/hysteresis data can be used during a task.

As described earlier, the calibration and hysteresis characterization data may be provided in the form of a look-up table, as some type of model relating $V_z$ to $z_p$ or $z_p$ to $V_z$ to describe the relationship between $V_z$ and $z_p$ based on calibration and hysteresis data, or both. A model could be used to generate the required input signal $V_z$ to achieve a desired displacement response $z_p$. Alternatively, given $V_z$, calibration/hysteresis data could be used to predict what $z_p$ will be. Implementation for calibration/hysteresis data generation and compensation for hysteresis and nonlinear sensitivity may be in hardware and/or software.

Other embodiments are contemplated. For example, the calibration and hysteresis characterization techniques can also be used for other AFM designs where a sample is placed on the actuator and the cantilever is fixed in space. Such AFM design would require that a cantilever holder be mounted and centered on the actuator, and may require a circuit to bias the piezoresistors. The piezoresistive cantilever could then be mounted on the holder and the actuator displacement calibration performed as described above. Also, although the calibration and hysteresis characterization mechanisms are illustrated within the context of an AFM environment, they are applicable to types of scanning probe microscopes besides atomic force microscopes, for example, a magnetic resonance force microscope having a cantilever coated with a magnetic material, and may also be applicable to other systems where the relationship between an input signal and displacement response it to be characterized. In addition, where the flexible structure is implemented as some type of cantilever, other types of calibration cantilevers, such as capacitive or piezoelectric, and suitable detection apparatus, allowing cantilever deflection (relative to the cantilever's base or fixed end) to be measured in some manner, can be used. Thus, the piezoresistive elements 76 (FIG. 3) could be replaced with capacitive elements, and the detection unit 66 suitably adapted to measure change in capacitance and convert that measurement to a voltage signal.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of calibrating a scanning probe microscope comprising:
   measuring a first value indicative of an acceleration sensitivity of a flexible structure;
   applying an input signal to an actuator of a scanning probe microscope to cause acceleration movement of the actuator;
   measuring a second value of deflection of the flexible structure attached to the actuator, as a result of the actuator movement, the second value being based on the first value; and
   determining from the deflection value a corresponding value of actuator displacement.

2. The method of claim 1 wherein the input signal comprises a sinusoidal voltage signal.

3. The method of claim 1 wherein the flexible structure comprises a cantilever.

4. The method of claim 3 wherein the actuator displacement is a vertical displacement.

5. The method of claim 4 further comprising:
   repeating the steps of measuring and determining for the application of different values of the input signal to the actuator to produce corresponding vertical displacement values within a predetermined range of vertical displacement values.

6. The method of claim 5 further comprising:
   generating a calibration map relating the different input signal values to the corresponding vertical displacement values for use by the scanning probe microscope.

7. The method of claim 4 wherein measuring comprises measuring at least one value of the deflection at more than one instant of time and wherein determining comprises determining from the deflection values multiple corresponding values of the actuator displacement.

8. The method of claim 7 further comprising:
   repeating the steps of measuring and determining for the application of different values of the input signal to the actuator to produce multiple corresponding vertical displacement values for each different input signal value within a predetermined range of vertical displacement values.

9. The method of claim 8 further comprising:
   generating a hysteresis map relating the different input signal values to the multiple corresponding vertical displacement values for use by the scanning probe microscope.

10. The method of claim 3 wherein the cantilever comprises a piezoelectric material.

11. The method of claim 3 wherein the cantilever comprises piezoresistive elements.

12. The method of claim 3 wherein the cantilever is coated with a magnetic material and the scanning probe microscope comprises a magnetic resonance force microscope.

13. The method of claim 1 wherein the scanning probe microscope comprises an atomic force microscope.

14. The method of claim 1 wherein the actuator comprises a piezoelectric actuator.

15. A method of characterizing a sample using a scanning probe microscope comprising:
   providing a probe at a first end of a cantilever having a second end mounted to an actuator; and
   controlling the vertical displacement of the actuator to position the probe relative to a sample to be characterized;
   wherein controlling comprises using a map to adjust input signals to the actuator used to produce the vertical displacement, the map comprising a mapping of input signals to the actuator to corresponding vertical displacement values obtained during a calibration by applying the input signals to the actuator and measuring a deflection of a calibration cantilever attached at one end to the actuator.

16. A method of characterizing a sample using a scanning probe microscope comprises:

providing a map to a controller of a scanning probe microscope having an actuator;

using the map in connection with a sample characterization task to compensate for nonlinear vertical displacement of the actuator; and wherein the map comprises a mapping of input signals to the actuator to corresponding vertical displacement values obtained by applying the input signals to the actuator and measuring a deflection of a flexible structure attached at one end to the actuator.

17. The method of claim 16 wherein the flexible structure comprises a calibration cantilever comprising a selected one of a piezoelectric material, piezoresistive elements, and a magnetic coating material.

18. The method of claim 16 wherein the actuator comprises a piezoelectric actuator.

19. A scanning probe microscope calibration apparatus comprising:

an actuator;

a flexible structure having one end that attaches to the actuator;

a first circuit to apply an input signal to the actuator, thereby causing acceleration of the actuator;

a second circuit to provide a value indicative of deflection of the flexible structure as a result of the actuator acceleration, the value being based on a measurement indicative of an acceleration sensitivity of the flexible structure; and a third circuit to determine from the deflection value a corresponding value of displacement of the actuator.

20. The scanning probe microscope calibration apparatus of claim 19 wherein the input signal comprises a sinusoidal voltage signal.

21. The scanning probe microscope calibration apparatus of claim 19 wherein the flexible structure comprises a cantilever.

22. The scanning probe microscope calibration apparatus of claim 21 wherein the displacement is a vertical displacement.

23. The scanning probe microscope calibration apparatus of claim 22 wherein the first circuit is operative to apply different input signal values to the actuator to produce corresponding vertical displacement values within a range of vertical displacement values.

24. The scanning probe microscope calibration apparatus of claim 23 further comprising:

means for generating a map relating the different input signal values to the corresponding vertical displacement values for use by the scanning probe microscope.

25. The scanning probe microscope calibration apparatus of claim 21 wherein the cantilever comprises piezoelectric material.

26. The scanning probe microscope calibration apparatus of claim 21 wherein the cantilever comprises piezoresistive elements.

27. The scanning probe microscope calibration apparatus of claim 26 wherein the second circuit comprises a Wheatstone bridge circuit to measure change in resistance of the piezoresistive elements.

28. The scanning probe microscope calibration apparatus of claim 21 wherein the cantilever comprises capacitive elements.

29. The scanning probe microscope calibration apparatus of claim 19 wherein the actuator comprises a piezoelectric actuator.

30. A scanning probe microscope comprising:

an actuator;

a probe attached to a first end of a cantilever, a second end of which is attached to the actuator;

a controller to control the vertical displacement of the actuator to position the probe relative to a sample to be characterized, the controller configured with a map for adjusting input signals to the actuator used to produce the vertical displacement; and wherein the map comprises a mapping of input signals to the actuator to corresponding vertical displacement values obtained by applying the input signals to the actuator and measuring a deflection of a calibration cantilever attached to the actuator.

31. The scanning probe microscope of claim 30 wherein the actuator comprises a piezoelectric actuator.

32. A scanning probe microscope comprising:

an actuator;

a probe attached to a first end of a cantilever, a second end of which is attached to the actuator;

a controller to control the vertical displacement of the actuator to position the probe relative to a sample to be characterized, the controller configured with a map for use in connection with the sample characterization to compensate for nonlinear vertical displacement of the actuator; and wherein the map comprises a mapping of input signals to the actuator to corresponding vertical displacement values obtained by applying the input signals to the actuator and measuring a deflection of a flexible structure attached to the actuator.

33. The scanning probe microscope of claim 32 wherein the flexible structure comprises a calibration cantilever comprising a selected one of a piezoelectric material, piezoresistive elements, and a magnetic coating material.

34. The scanning probe microscope of claim 32 wherein the actuator comprises a piezoelectric actuator.

35. An article comprising:

a storage medium having stored thereon instructions that when executed by a machine result in the following:

causing an input signal to be applied to an actuator of a scanning probe microscope to cause an acceleration of the actuator;

obtaining a value indicative of deflection of a flexible structure attached to the actuator, as a result of the actuator acceleration, the value being based on a measurement indicative of an acceleration sensitivity of the flexible structure; and determining from the deflection value a corresponding value of actuator displacement.

36. The article of claim 35 wherein the actuator comprises a piezoelectric actuator.

* * * * *

UNITED STATES PATENT AND TRADEMARK OFFICE
CERTIFICATE OF CORRECTION

PATENT NO. : 7,041,963 B2
APPLICATION NO. : 10/722806
DATED : May 9, 2006
INVENTOR(S) : El Rifai et al.

It is certified that error appears in the above-identified patent and that said Letters Patent is hereby corrected as shown below:

Column 2, line 49, delete "may include be a" and replace with -- may be a --.

Column 4, line 14-15, delete "means for example a" and replace with -- means, for example, a --.

Column 4, line 47, delete ", or vice versa provide" and replace with --, or vice versa, provides --.

Column 4, line 50, delete "sensitivity the" and replace with -- sensitivity. The --.

Column 5, line 22, delete "measures for example the" and replace with -- measures, for example, the --.

Column 7, line 67, delete "be need." and replace with -- be needed --.

Column 8, lines 30-31, delete "according the equations." and replace with -- according to the equations. --.

Column 9, line 36, delete "this exception" and replace with -- the exception --.

Column 10, line 48, delete "selected typed" and replace with -- selected type --.

Column 12, line 18, delete "analytical" and replace with -- analytically --.

Column 13, line 10, delete "can be use" and replace with --can be used --.

Column 13, line 29, delete "AFM design" and replace with -- AFM designs --.

UNITED STATES PATENT AND TRADEMARK OFFICE
CERTIFICATE OF CORRECTION

PATENT NO. : 7,041,963 B2
APPLICATION NO. : 10/722806
DATED : May 9, 2006
INVENTOR(S) : El Rifai et al.

It is certified that error appears in the above-identified patent and that said Letters Patent is hereby corrected as shown below:

Column 13, line 41, delete "response it to be" and replace with -- response is to be --.

Signed and Sealed this

Twenty-eighth Day of November, 2006

JON W. DUDAS
*Director of the United States Patent and Trademark Office*